(12) United States Patent
Mizutani

(10) Patent No.: US 7,250,850 B2
(45) Date of Patent: Jul. 31, 2007

(54) VEHICULAR SAFETY APPARATUS

(75) Inventor: Yasuji Mizutani, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 143 days.

(21) Appl. No.: 10/669,855

(22) Filed: Sep. 25, 2003

(65) Prior Publication Data

US 2004/0122573 A1    Jun. 24, 2004

(30) Foreign Application Priority Data

Oct. 30, 2002    (JP)    ............... P2002-316693

(51) Int. Cl.
*B60Q 1/00*    (2006.01)

(52) U.S. Cl. .............. 340/435; 340/903; 701/45; 701/70; 180/271

(58) Field of Classification Search ............ 340/435, 340/436, 903; 701/45, 70; 180/271; 342/71
See application file for complete search history.

(56) References Cited

U.S. PATENT DOCUMENTS

| | | | |
|---|---|---|---|
| 6,308,796 B1 | 10/2001 | Fuchs et al. | |
| 6,493,621 B2 * | 12/2002 | Tamura et al. | 701/70 |
| 6,624,747 B1 * | 9/2003 | Friederich et al. | 340/436 |
| 6,737,963 B2 * | 5/2004 | Gutta et al. | 340/435 |
| 6,847,894 B1 * | 1/2005 | Hasegawa | 701/301 |
| 7,102,495 B2 | 9/2006 | Mattes et al. | |
| 2002/0091478 A1 | 7/2002 | Tamura et al. | |
| 2004/0153217 A1 | 8/2004 | Mattes et al. | |

FOREIGN PATENT DOCUMENTS

| | | |
|---|---|---|
| DE | 197 49 296 C 1 | 7/1999 |
| DE | 198 17 326 A 1 | 10/1999 |
| JP | A-9-315275 | 12/1997 |
| JP | A-10-81212 | 3/1998 |
| JP | A-10-244921 | 9/1998 |
| JP | A-11-20637 | 1/1999 |
| JP | A 11-124019 | 5/1999 |
| JP | A-2003-507255 | 2/2003 |
| JP | A-2004-524214 | 8/2004 |
| WO | WO 00/10853 A1 | 3/2000 |
| WO | WO 01/14184 A1 | 3/2001 |

* cited by examiner

*Primary Examiner*—Anh V. La
(74) *Attorney, Agent, or Firm*—Oliff & Berridge, PLC

(57) ABSTRACT

A vehicular safety apparatus of the present invention is one actuated according to a collision prediction level of a vehicle. The vehicular safety apparatus of the present invention is provided with a determining device for determining a collision prediction level on the basis of a relative position between a vehicle and an obstacle ahead of the vehicle; a storage for storing a amount of brake operation by a driver at a point where the collision prediction level exceeds a predetermined threshold, as a reference level; and an actuation controller for actuating the safety apparatus in accordance with an increase from the reference level. This prevents the actuation of the safety apparatus from being excessive in the case where an increase of the amount of brake operation is low. Furthermore, in the case of the increase being high, the actuation is controlled so as to fully bring out the performance of the safety apparatus. Therefore, the performance of the safety apparatus can be suitably demonstrated without causing the driver to feel odd.

20 Claims, 15 Drawing Sheets

VEHICULAR SAFETY APPARATUS

BACKGROUND OF THE INVENTION

1. Field of the Invention

The present invention relates to vehicular safety apparatus actuated, for example, in cases where a vehicle is at high risk of collision.

2. Related Background Art

There are conventionally known vehicular safety apparatus with a brake assist system which generates a higher brake pressure than a brake pressure by a driver's braking operation when an intervehicle distance becomes smaller than a predetermined threshold. For example, Japanese Patent Application Laid-Open No. 11-124019 (pp.11–12, and FIG. 6) discloses the technique of setting up the intervehicle distance threshold suitable for a driver based on his (her) driving pattern, so as to provide the suitable brake assist. This brake assist control is started when the intervehicle distance becomes smaller than the threshold and when the brake pedal stroke velocity becomes faster than a predetermined velocity.

SUMMARY OF THE INVENTION

Even if the intervehicle distance threshold is suitably set up based on the driver's driving pattern, as disclosed in the above Japanese Patent Application, the brake assist control is not initiated before the brake pedal is stroked faster than the predetermined stroke velocity. The effect of the brake assist control is brought only when the brake pedal is stroked faster than the predetermined stroke velocity.

In this respect, it is also conceivable that the above disadvantage is circumvented if a lower stroke velocity threshold is set as an initiation condition for the brake assist control. However, if the driver depresses a brake pedal slowly when the intervehicle distance is smaller than the predetermined threshold, the brake assist control will increases the braking force up to a prescribed brake assist force suddenly when the control is started. Then the driver will feel a deceleration largely different from the operating feeling on the brake pedal.

Furthermore, in the case where an avoidance operation with manipulation of the steering wheel is also carried out in addition to the braking operation, the above deceleration can induce degradation of the steering feeling in the avoidance operation.

The present invention has been accomplished in order to solve the above problem. And an object of the invention is to provide vehicular safety apparatus capable of suitably demonstrating its performance without causing the driver to feel odd, by being actuated adequately reflecting the actual operation feeling during the driver's braking operation.

The present invention is a vehicular safety apparatus actuated according to a collision prediction level of a vehicle. The vehicular safety apparatus of the present invention comprises determining means for determining a collision prediction level of a vehicle on the basis of a relative position between the vehicle and an obstacle ahead of the vehicle; storage means for storing an amount of brake operation by a driver at a point where the collision prediction level of the vehicle exceeds a predetermined threshold, based on a result of determination by the determining means; and actuation control means for, while defining the amount of brake operation stored in the storage means, as a reference level, actuating the safety apparatus in accordance with an increase of the amount of brake operation from the reference level.

Since the actuation control means performs the control of actuation of the safety apparatus in accordance with an increase of the amount of brake operation from the reference level stored in the storage means, the actuation control is executed so as to prevent the excessive actuation when the increase of the amount of brake operation by the driver is low and so as to fully demonstrate the performance when the increase of the amount of brake operation by the driver is high. It is defined herein that the point where the collision prediction level exceeds the predetermined threshold includes a point immediately before crossing over the threshold.

The vehicular safety apparatus is preferably configured to further comprise prohibiting means for prohibiting the actuation control means from performing a control process if the determining means continuously determines the collision prediction level of not less than a predetermined level for a fixed period. When the safety apparatus is provided with such prohibiting means, the vehicular safety apparatus can be prevented from being actuated in an undesirable manner, for example, in the case where the determining means continuously makes incorrect determinations due to sensor failure or the like.

In another preferred configuration, the safety apparatus further comprises prohibiting means for prohibiting the actuation control means from performing a control process in at least one of a case where a vehicular velocity is a predetermined low velocity including a stop state and a case where a gearshift lever is placed in a non-forward position. At low vehicle speeds or during a stop, there is often no need for the control of actuation of the safety apparatus as described above, but the vehicle can be close with an opponent vehicle and the safety apparatus can be actuated. While the gearshift lever is placed in a non-forward position such as N (neutral) or P (parking), there is less need for actuation of the safety apparatus. In the case where the vehicle velocity is low or in the case where the gearshift lever is placed in a non-forward position, it is considered that there is no need for the control of actuation of the safety apparatus, and the prohibiting means prohibits the actuation control means from performing the control process, so as to prevent the unwanted actuation of the vehicular safety apparatus.

The prohibition of the determination process itself to be carried out by the determining means results in supplying no determination result to the actuation control means, and this results in prohibiting the control process of the actuation control means. Therefore, the prohibiting means is also supposed to embrace a case where it prohibits the determination process of the determining means.

The safety apparatus is preferably configured so that on the occasion of carrying out the control of actuation in accordance with the increase from the reference level, the increase being supposed to be equal, the actuation control means carries out the actuation control for greater increases in the higher collision prediction level than in the lower collision prediction level. When the actuation control means is made to execute the actuation control for greater increases from the reference level in the high collision prediction level, the performance of the safety apparatus is demonstrated better. In the low collision prediction level, the actuation of the safety apparatus is prevented from becoming excessive.

The safety apparatus is preferably configured so that the actuation control means further comprises minimum control means for, when the increase of the amount of brake operation from the reference level is within a range of a predetermined small increase, carrying out the control of actuation in accordance with a predetermined increase over the range of the small increase. Since the safety apparatus is actuated according to the increase from the reference level by the actuation control means, the safety apparatus is actuated only slightly when the increase from the reference level is small. Therefore, there can also occur an event where the performance of the apparatus is not fully demonstrated. While also considering that the status is the situation where the collision prediction level exceeds the predetermined threshold, the minimum control means performs the actuation control according to the predetermined increase over the range of the small increase even in the case where the increase from the reference level is within the range of the predetermined small increase, whereby the minimum required performance of the safety apparatus is demonstrated with certainty.

The safety apparatus is preferably configured to further comprise prohibiting means for prohibiting the minimum control means from performing the actuation control if the increase of the amount of braking operation from the reference level is within the range of the predetermined small increase and if the reference level is within a predetermined slow braking range. As the determination result is received from the determining means, the amount of brake operation at the point where the collision prediction level of the vehicle exceeds the predetermined threshold is defined as a reference level. However, in the case where the reference level is within the slow braking range, there is less necessity for the actuation of the safety apparatus and there is a high possibility that the determining means made an incorrect determination that the collision prediction level was high. If the minimum control means acts in such cases, the safety apparatus will be actuated, so as to cause the driver to feel odd. Therefore, the prohibiting means prohibits the minimum control means from performing the control of actuation in the case where the reference level is within the slow braking range, which can alleviate the odd feeling that might be caused where the safety apparatus is erroneously actuated during the slow braking period.

The safety apparatus is preferably configured to further comprise brake control means for generating a brake assist force to increase a braking force according to a braking operation, and the actuation control means controls the brake control means to generate a greater brake assist force as the increase of the amout of brake operation from the reference level becomes larger. The actuation control means controls the brake control means in the safety apparatus. This results in generating the brake assist force according to the increase of the amount of brake operation from the reference level, whereby the brake assist force is prevented from becoming excessive in the case where the increase of the amount of brake operation is low (small) and whereby the brake assist force becomes greater in the case where the increase of the amount of brake operation is high (large).

Preferably, the amount of brake operation by the driver is a quantity indicating a force of driver's braking operation. The quantity indicating the force of driver's braking operation can be a pressure of a brake master cylinder increased by a force on the brake pedal. A larger braking force acts with hard braking, in other words, with the need for actuation of the safety apparatus. When the control the safety apparatus is carried out on the basis of the force of driver's braking operation in this way, the performance of the safety apparatus can be suitably demonstrated without causing the driver to feel odd.

DESCRIPTION OF THE PREFERRED EMBODIMENTS

Figure 1:
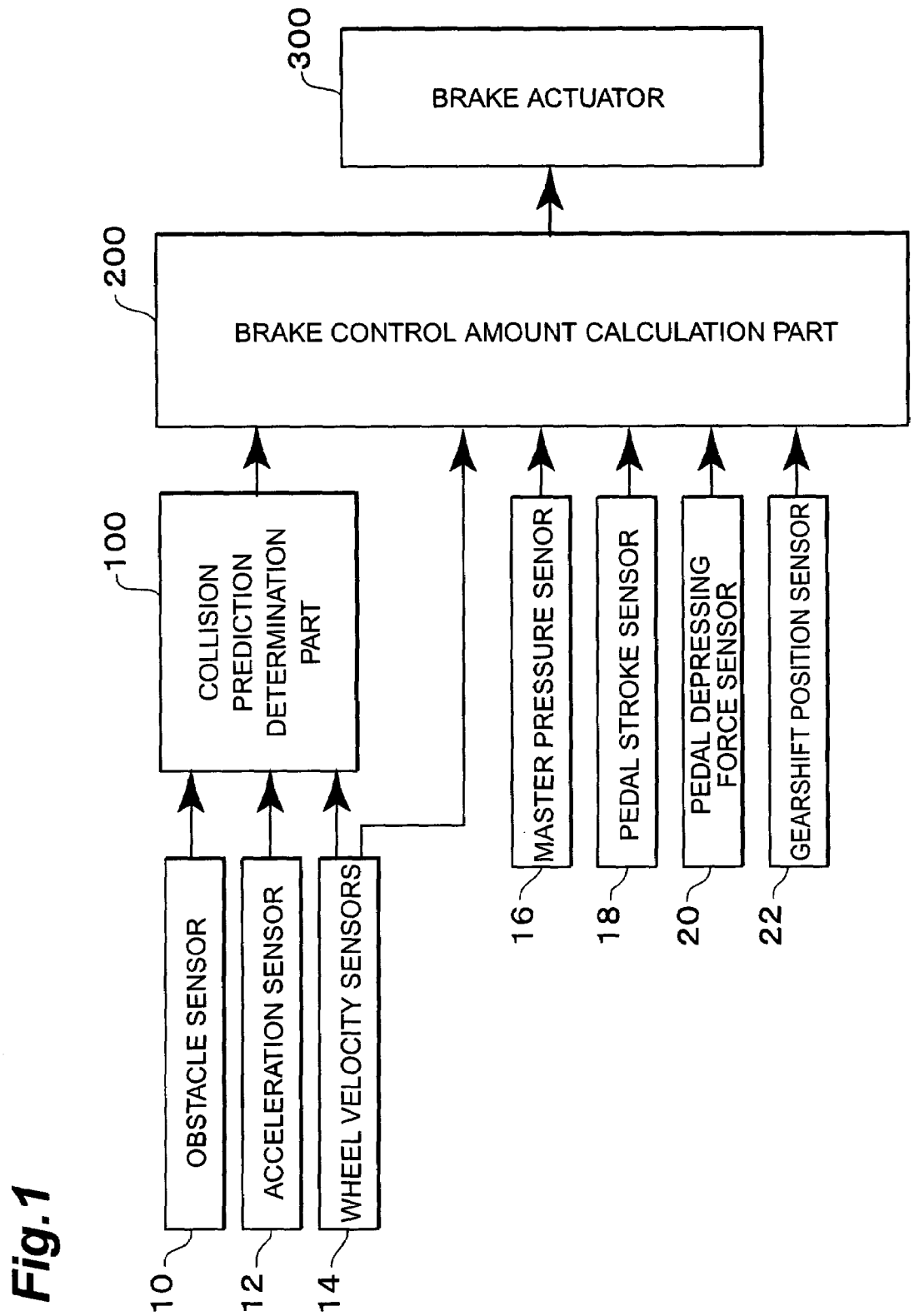
FIG. 1 is a block diagram showing a configuration of a vehicular safety apparatus according to an embodiment.

FIG. 1 shows an overall configuration of a vehicular safety apparatus. This vehicular safety apparatus is a safety apparatus for imparting a brake assist force in the event of high risk of collision, and comprises collision prediction determination part 100 for determining a collision prediction level of a vehicle on the basis of a relative position between the vehicle and an obstacle ahead of the vehicle; brake control amount calculation part 200 for receiving the result of the determination made by the collision prediction determination part 100 and setting a brake assist amount based thereon; brake actuator 300 for generating a brake assist force according to the brake control amount calculated by the brake control amount calculation part 200, and so on.

Figure 2:
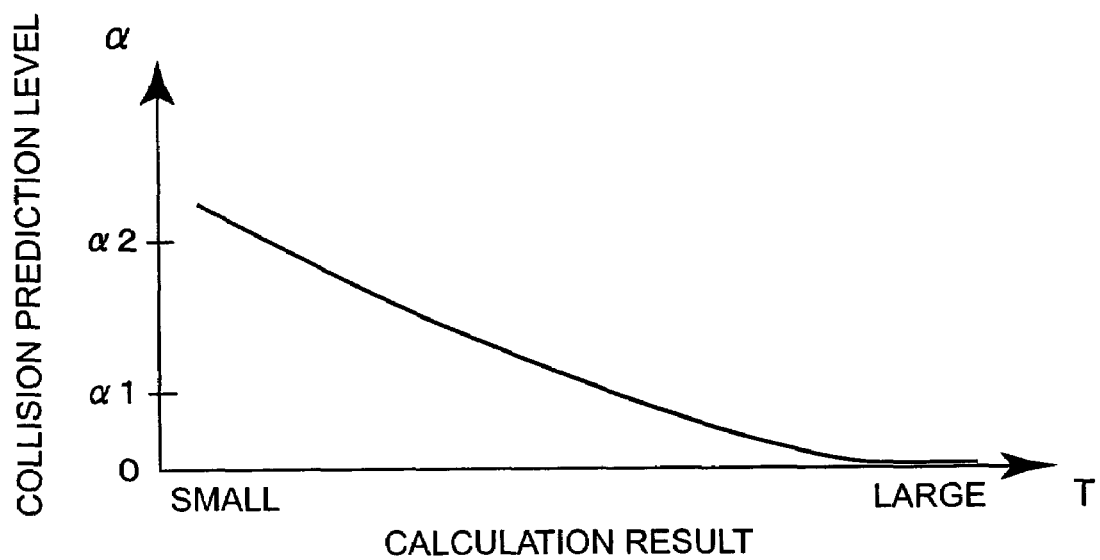
FIG. 2 is a transformation diagram stipulating the relationship between calculation result T and collision prediction level $\alpha$.

The collision prediction determination part 100 for determining the collision prediction level is given results of detection by an obstacle sensor 10 provided with a distance radar for detecting a distance and a relative velocity between the vehicle and an object ahead of the vehicle as radar data, by an acceleration sensor 12 for detecting a longitudinal acceleration acting on the vehicle, and by wheel velocity sensors 14 for detecting rotating velocities of the wheels. The collision prediction determination part 100 determines the distance (intervehicle distance) and relative velocity to the object ahead of the vehicle on the basis of the distance information and relative velocity information to the object ahead of the vehicle (obtained from the detection result of obstacle sensor 10), the acceleration/deceleration information of the vehicle (obtained from the detection result of acceleration sensor 12), and the vehicle velocity information (obtained from the detection result of wheel velocity sensors 14). And the collision prediction determination part 100 performs the calculation of T=(intervehicle distance)/(relative velocity). Then this calculation result T is transformed into danger prediction level α according to the transformation chart shown in FIG. 2, so as to determine the degree of danger prediction. This calculation result T is a value corresponding to a "time up to a collision" and the danger prediction level α tends to increase with decrease in the value of calculation result T. In the calculation process of T, a coefficient to decrease the value of T with increase in vehicle velocity may be set according to the vehicle velocity. In another potential configuration, a correction process can be carried out so as to increase the value of danger prediction factor a with increase in the vehicle velocity, even for the same calculation result T.

In addition to the determination result by the collision prediction determination part 100, the brake control amount calculation part 200 is given detection results of master pressure sensor 16 for detecting the hydraulic pressure in the master cylinder, pedal stroke sensor 18 for detecting a stroke amount of the brake pedal, pedal depressing force sensor 20 for detecting a depressing force as a force on the brake pedal, a shift position sensor indicating a position of the gearshift lever, and wheel velocity sensors 14 for detecting the rotating velocities of the respective wheels. The brake control amount calculation part 200 executes the control of brake actuator 300 on the basis of these input information.

Figure 3:
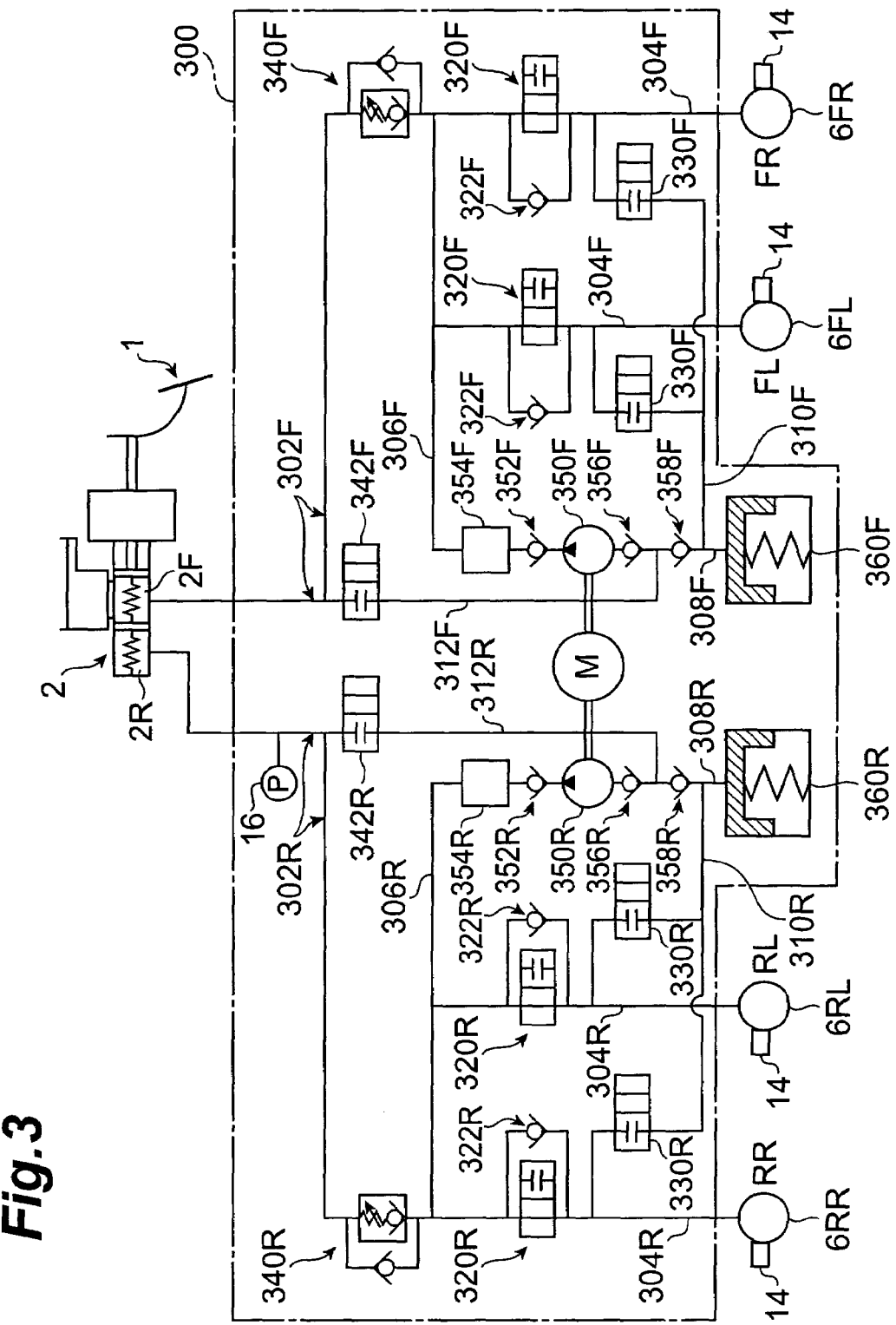
FIG. 3 is a hydraulic system diagram showing a configuration of a brake actuator.

FIG. 3 shows a configuration of brake actuator 300. A master cylinder 2 has two independent pressure chambers 2F, 2R connected in series, and each pressure chamber 2F, 2R is filled with a brake fluid. When the brake pedal 1 is depressed, the volume of pressure chambers 2F, 2R in the master cylinder 2 varies to increase the fluid pressure of the brake fluid filled therein; the hydraulic pressure to act on wheel cylinders 6FL, 6FR (the left and right front wheels) is established in the pressure chamber 2F, and the hydraulic pressure to act on wheel cylinders 6RL, 6RR (the rear wheels) is established in the pressure chamber 2R.

Hydraulic passage 302F is connected at one end to pressure chamber 2F and connected at the other end to master cut valve 340F. The master cut valve 340F is constructed in a configuration wherein a linear valve capable of linearly adjusting the flow rate and a check valve for checking counter flow are connected in parallel. The check valve has a function of permitting the flow when the pressure chamber 2F is higher in pressure than the wheel cylinders 6FL, 6FR, i.e., the flow of the brake fluid from pressure chamber 2F to wheel cylinders 6FL, 6FR, but blocking the flow of the brake fluid in the direction opposite thereto. The linear valve has a function of blocking the flow of the brake fluid from pressure chamber 2F to wheel cylinders 6FL, 6FR and being capable of linearly changing the flow rate according to a given control signal (electric current signal), for the brake fluid flowing from wheel cylinders 6FL, 6FR to pressure chamber 2F (or suction valve 342F).

NO(Normally Open)-type switch valve 320F to switch between OPEN and CLOSE in response to on and off signals is provided midway in each hydraulic passage 304F connecting the master cut valve 340F to wheel cylinder 6FL, 6FR, and check valve 322F for checking the flow of the brake fluid toward wheel cylinder 6FL, 6FR is provided in parallel with the switch valve 320F.

Hydraulic pump 350F rotated by motor M functions as a hydraulic source during control of the brake assist force and a discharge port of this hydraulic pump 350F is connected via check valve 352F for checking counter flow toward the discharge port, and via damper chamber 354F to downstream of master cut valve 340F by hydraulic passage 306F. This permits the brake fluid discharged from hydraulic pump 350F to be supplied through hydraulic passages 306F and 304F to wheel cylinders 6FL, 6FR.

A suction port of this hydraulic pump 350F is connected through hydraulic passage 308F to reservoir 360F, and this hydraulic passage 308F is provided with check valves 356F, 358F for checking the flow of the brake fluid in the direction opposite to the suction direction.

Each hydraulic passage 304F between switch valve 320F and wheel cylinder 6FL, 6FR is connected through hydraulic passage 310F to reservoir 360F, and NC(Normally Close)-type switch valve 330F to switch between OPEN and CLOSE in response to on and off signals is provided midway in the hydraulic passage 310F.

Furthermore, hydraulic passage 312F connects the hydraulic passage 302F to hydraulic passage 308F between the check valves 356F, 358F, and suction valve 342F to switch between OPEN and CLOSE in response to on and off signals is provided midway in the hydraulic passage 312F. A suction amount into hydraulic pump 350F can be controlled by open/close switch control or Duty control of suction valve 342F, whereby a discharge amount of the brake fluid from the hydraulic pump 350F can be adjusted.

Correspondingly, the hydraulic transmission system for rear wheels RL, RR between pressure chamber 2R and wheel cylinders 6RL, 6RR is also constructed in much the same configuration as that for front wheels FR, FL described above. In FIG. 3, the corresponding components in the hydraulic transmission system for rear wheels RL, RR are denoted by the same reference symbols as those for the respective components in the system for front wheels FR, FL except that "F" is replaced by "R," and the description thereof is omitted herein.

The brake pedal 1 is provided with pedal stroke sensor 18 for detecting a stroke of depression on the brake pedal 1, and pedal depressing force sensor 20 for detecting the pedal depressing force as a force on the brake pedal 1, and master pressure sensor 16 for detecting the hydraulic pressure generated at master cylinder 2 is provided on the hydraulic passage 302R.

The brake actuator 300 constructed of the pumps, various valve units, etc. as described above is subjected to control of actuation by brake control amount calculation part 200. The brake control amount calculation part 200 executes each of a brake assist control of generating a greater braking force upon emergency braking, an intervehicle distance control of securing a predetermined intervehicle distance relative to a preceding vehicle, etc., and controls the actuation of brake actuator 300 in accordance with the various control processes.

Among the control processes over the brake actuator 300 executed by the brake control amount calculation part 200, the brake assist control processing will be described below along the flowchart of FIG. 4.

After a start by an on operation of the ignition switch, the calculation part first proceeds to step ("step" will be represented hereinafter by "S") 102 to retrieve the wheel velocities WV of the respective wheels FL, FR, RL, RR, the shift position information of the gearshift lever, the master pressure P, and the collision prediction level α determined by collision prediction determination part 100, and then moves to S104 to calculate the vehicle velocity V of the vehicle on the basis of the wheel velocities WV of the respective wheels FL, FR, RL, RR.

At subsequent S106, the calculation part determines whether the vehicle velocity V calculated at S104 is smaller than a threshold Vth indicating a predetermined low velocity, and at next S108 the calculation part determines whether the gearshift lever is placed in one of the P (parking) position, the N (neutral) position, and the R (reverse) position, i.e., whether the gearshift lever is placed in a non-forward position.

The determination processes of S106 and S108 will be described below. Under a situation in which the vehicle is running at an extremely low vehicle velocity V, the brake assist control is less necessary. Furthermore, since the collision prediction determination is made on the basis of the relative position with another vehicle (an obstacle ahead of the vehicle) by the obstacle sensor using the radar device, there can occur such events that, particularly, even during a stop of the vehicle at an intersection or the like (vehicle velocity V=0), the collision prediction level can increase because of another vehicle turning right, so as to unnecessarily actuate the brake actuator 300. In addition, the gearshift lever is normally positioned at the operation position of N (neutral) during a tow of the vehicle, and the intervehicle distance to the preceding car pulling the host car tends to be relatively close; therefore, there can occur cases where the collision prediction level increases. During parking just before a sloping road (particularly, a rising gradient) with the gearshift lever at the P (parking) position, the sloping road can be recognized as an obstacle ahead of the vehicle. During backward movement of the vehicle with the gearshift lever at the R (reverse) position, the vehicle normally runs at very low velocity and thus the brake assist control is less necessary.

As described above, the determination processes of S106 and S108 are substantially to make determinations on prohibition conditions for prohibiting execution of the brake assist control. When either of these S106 and S108 results in making the determination of "Yes," the calculation part moves to S122 to turn off the motor M for driving the hydraulic pumps 350F, 350R and then moves to S124 to store the value of master pressure P retrieved at S102, as pressure reference value Ps used as a reference in setting of the brake assist force. Thereafter, the current routine is terminated.

In this situation, the actuation control over each valve unit is not executed yet, and thus each valve unit is maintained in an initial state; the suction valves 342F, 342R are closed, the switch valves 320F, 320R are opened, the switch valves 330F, 330R are closed, whereby the hydraulic pressure of each pressure chamber 2F, 2R of the master cylinder 2, which is generated by the depressing operation on the brake pedal 1, is imparted to the wheel cylinders 6FL, 6FR, 6RL, 6RR.

On the other hand, when the determination processes of S106 and S108 both result in making the determination of "No," the calculation part moves to S110 to further determine whether the value of collision prediction level $\alpha$ retrieved at S102 is larger than relatively low prediction level $\alpha 1$. When the value of collision prediction level $\alpha$ is not more than the relatively low prediction level $\alpha 1$ (in the case of "No" at S110), the calculation part transfers to the processes at and after S122 described previously. However, when the collision prediction level $\alpha$ is greater than $\alpha 1$ (in the case of "Yes" at S110), the calculation part proceeds to S112 to turn on the motor M for driving the hydraulic pumps 350F, 350R, thereby getting ready for a start of the brake assist control. If the motor M should be switched on at the timing of actually starting the control, some time would be taken before the motor M reaches the frequency of rotation intended for the control. In contrast, when the motor M is preliminarily turned on when the collision prediction level $\alpha$ becomes greater than the relatively low $\alpha 1$ as described above, the motor can reach the predetermined rotation frequency at the time of a start of control, so as to enhance the response of hydraulic control.

After the motor M is switched on at S112, the calculation part goes to S114 to determine whether the value of master pressure P retrieved at S102 is smaller than a predetermined large hydraulic pressure Pm. The case of "No" is a situation in which before a start of the brake assist control the driver adequately depresses the brake pedal 1 so as to generate a large hydraulic pressure. In this case, the brake assist control is unnecessary, and thus the calculation part moves to the processes at and after S124 to terminate the current routine without execution of the brake assist control.

In the case of "Yes" at S114, i.e., when the value of master pressure P retrieved at S102 is smaller than the hydraulic pressure Pm, the calculation part moves to S116 to determine whether the value of collision prediction level $\alpha$ exceeds $\alpha 2$ greater than $\alpha 1$. When the collision prediction level $\alpha$ is not more than $\alpha 2$ (in the case of "No" at S116), it is assumed that the start conditions for the brake assist control are not met, and thus the calculation part goes to S124 to terminate the current routine without execution of the brake assist control.

When the collision prediction level $\alpha$ exceeds $\alpha 2$ (in the case of "Yes" at S116), the calculation part moves to S118 to set $\Delta P=(P-Ps)\times K$ as braking increase $\Delta P$ corresponding to a brake assist force. In this equation "K" is a predetermined increase coefficient (K>0), "P" the master pressure retrieved at S102, and "Ps" the pressure reference value set at S124 in the last or previous routine.

Thereafter, the calculation part goes to S120 to carry out the control of actuation of the brake actuator 300 so that the hydraulic pressure higher by $\Delta P$ than the hydraulic pressure generated by the driver's braking operation acts on the wheel cylinders 6FL, 6FR, 6RL, 6RR, based on the braking increase $\Delta P$ calculated at S118. During this operation, the suction valves 342F, 342R are made open (or are subjected to open/close duty control), the motor M is duty-driven, and control is made on the opening amount of the linear valve in the master cut valve 340F.

When the processing as described above is repeatedly carried out, the brake assist control is implemented with the brake assist force according to the increase deviation (P-Ps). P is the present master pressure. Ps is the pressure reference value stored when the brake assist control is started. This makes it feasible to prevent an excessive brake assist force from being generated in the case of the small increase of the amount of brake by the driver and to generate a larger brake assist force in the case of the large increase of the amount of brake operation.

Although illustration is omitted from the flowchart of FIG. 4, the operation is carried out as follows after the start of the brake assist control at S120: the brake assist control continues while the master pressure P is not less than the pressure reference value Ps; the brake assist control is terminated when the master pressure P becomes lower than the pressure reference value Ps.

Figure 4:
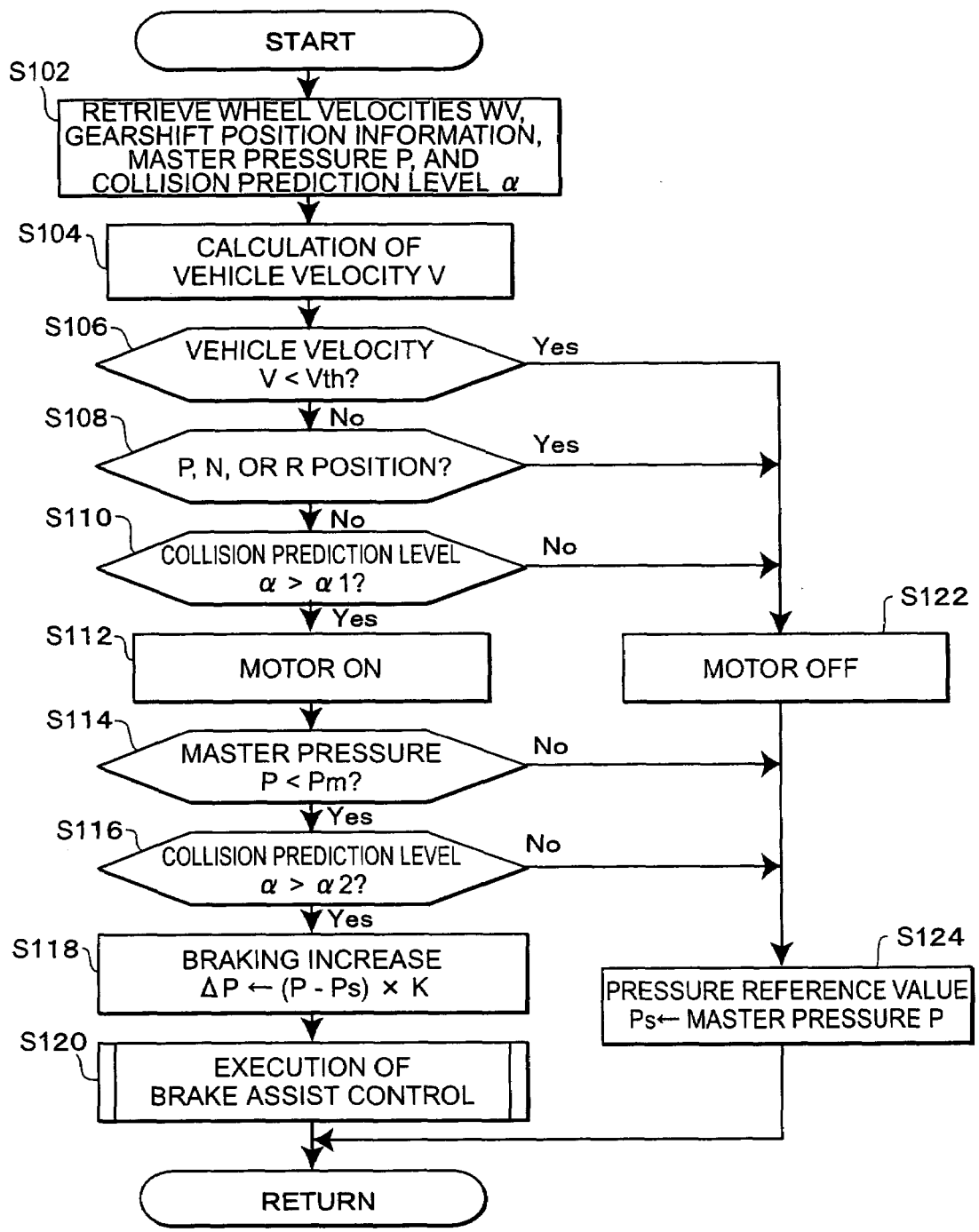
FIG. 4 is a flowchart showing brake assist control processing.

Although illustration is omitted from the flowchart of FIG. 4, when the collision prediction level $\alpha$ is decreased to not more than $\alpha 2$ after the start of the brake assist control at S120, i.e., when the determination of "No" is made at S116 during the brake assist control, the brake assist control is terminated. On this occasion, it is desirable to execute a pressure decrease control process of decreasing the hydraulic pressure acting on the wheel cylinders 6FL, 6FR, 6RL, 6RR so that the hydraulic pressure acting on the wheel cylinders 6FL, 6FR, 6RL, 6RR decreases to the hydraulic pressure according to the driver's braking operation at a predetermined pressure decreasing gradient. An example of the control in this case is such that the suction valves 342F, 342R are closed and the valve travel of the linear valve in the master cut valve 340F is gradually increased to the open position at a predetermined gradient, so as to gradually decrease the hydraulic pressure acting on the wheel cylinders 6FL, 6FR, 6RL, 6RR to the hydraulic pressure according to the driver's braking operation.

As described above, the flowchart of FIG. 4 exemplified the case where the brake assist control was terminated when the collision prediction level $\alpha$ became not more than $\alpha 2$ after the start of the brake assist control at S120. This is just a preferred embodiment in the case of the intervehicle distance control to secure the predetermined intervehicle distance between the vehicle and the preceding vehicle, and the present invention is not limited to this example. It is also possible to adopt a technique of continuing the brake assist control to a halt of the vehicle (vehicle velocity V=0) after the start of the brake assist control at S120, for example, in the case of a precrash brake control with higher urgency, such as collision avoidance.

Figure 5:
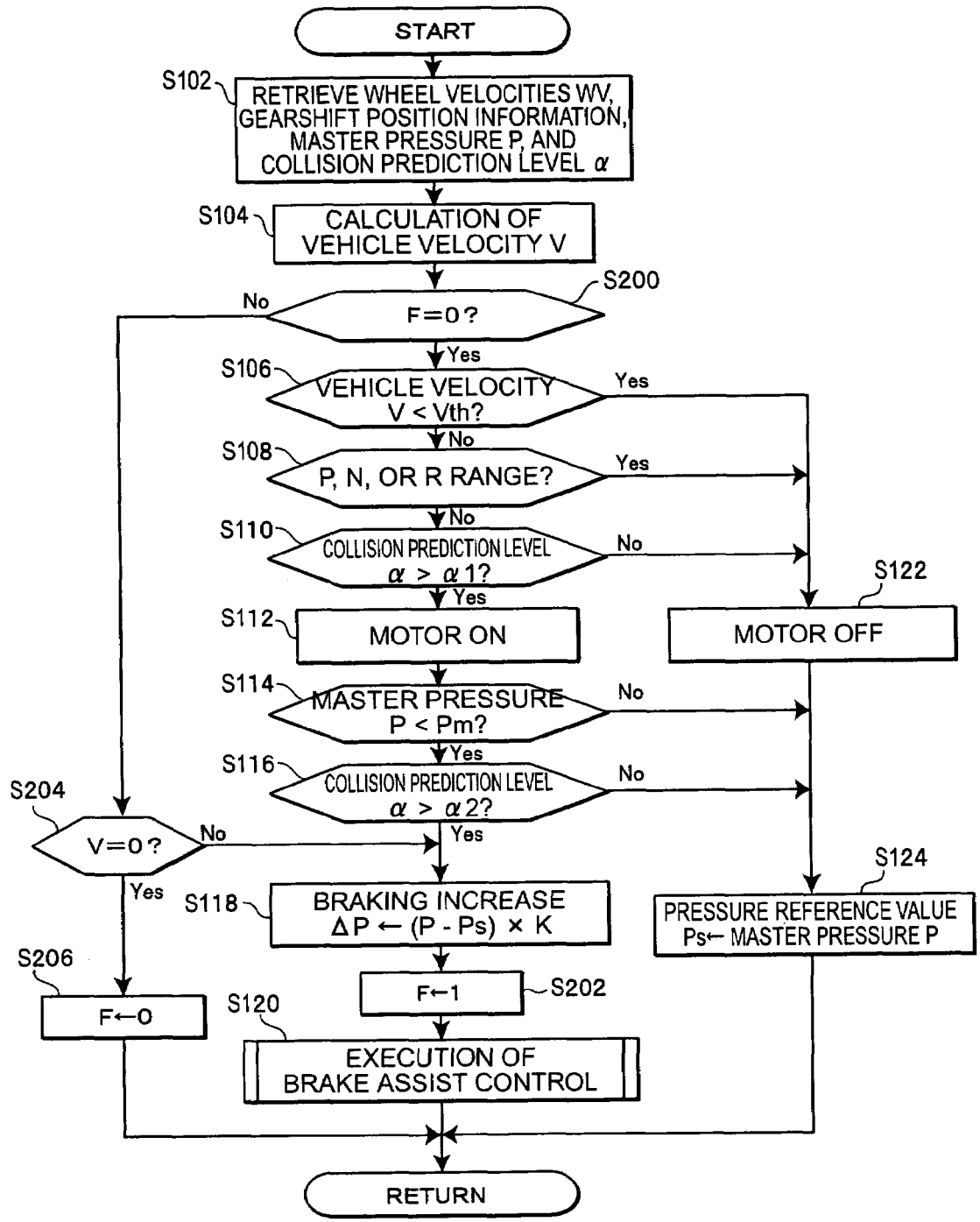
FIG. 5 is a flowchart showing the brake assist control processing according to another embodiment.

An example of this control is presented in the flowchart of FIG. 5. The flowchart of FIG. 5 employs all the process steps in the flowchart of FIG. 4 and S200's step numbers represent newly added process steps.

The added steps will be described below. At S104 the calculation part calculates the vehicle velocity V and then moves to S200 to determine whether the value of flag F satisfies F=0, i.e., whether the present status is before a start of the brake assist control. The flag F is set to F=1 at S202 subsequent to S118, whereby the flag F serves as a flag indicating a progress of execution of the brake assist control.

At S200, if the brake assist control is not started yet (in the case of "Yes" at S200), the calculation part moves to the processes at and after S106. When the brake assist control is already active (in the case of "No" at S200), the calculation part moves to S204 to determine whether the vehicle velocity V calculated at S104 satisfies V=0. When the vehicle is not stopped yet (in the case of "No" at S204), the calculation part transfers to the processes at and after S118. When the vehicle comes to a halt with repetition of this routine, S204 results in making the determination of "Yes" and then the calculation part proceeds to S206 to reset the flag F to F=0. Then this routine is terminated.

By executing the control processing as described above, it becomes feasible to continue the brake assist control before a halt of the vehicle (vehicle velocity V=0) once the brake assist control is started at S120. Although illustration is omitted from the flowchart of FIG. 5, it is desirable to execute the pressure decrease control process of gradually decreasing the hydraulic pressure acting on the wheel cylinders 6FL, 6FR, 6RL, 6RR, as described previously, at S206 of the termination process.

Figure 6:
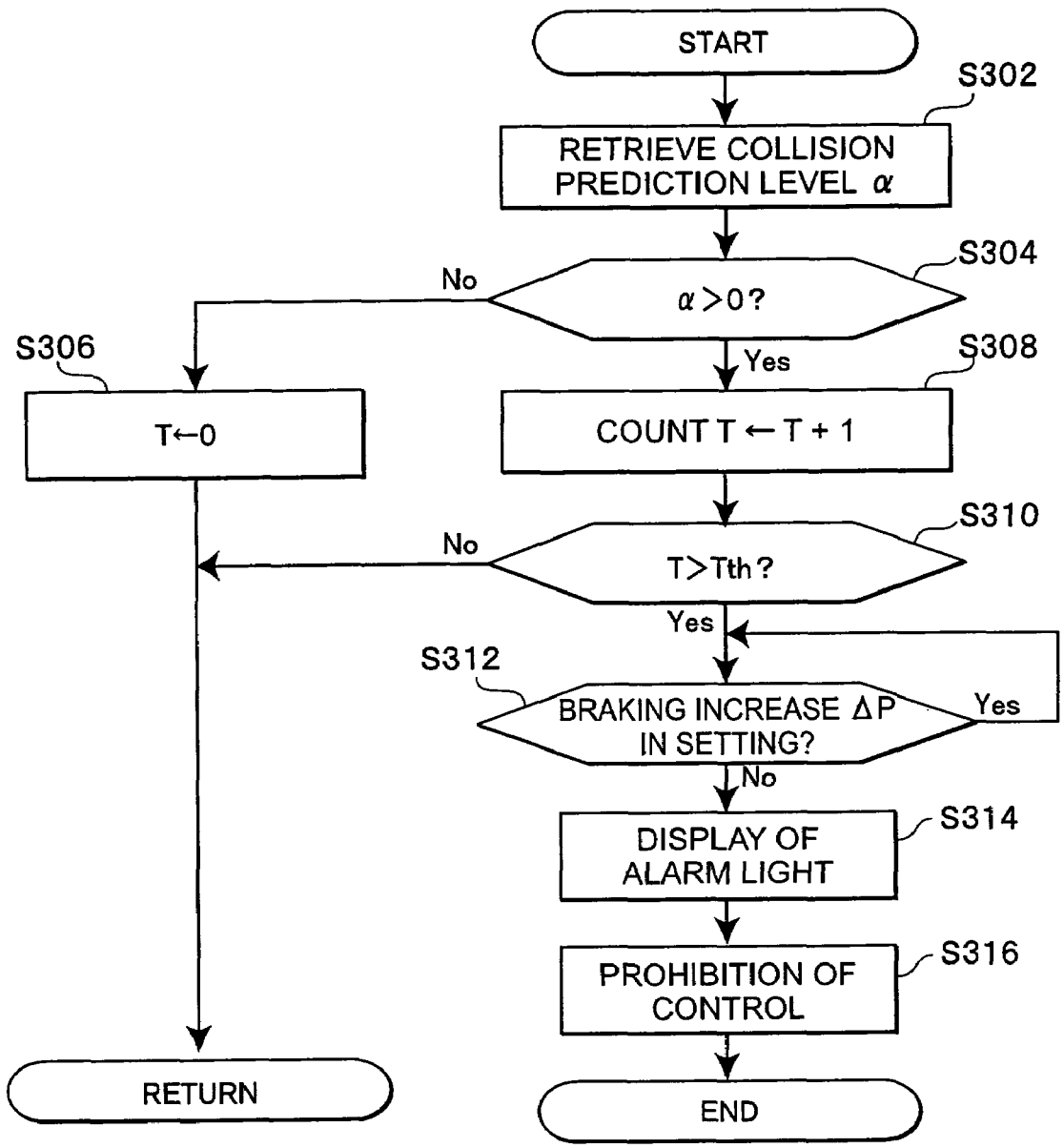
FIG. 6 is a flowchart showing a process of prohibiting the brake assist control.

Another embodiment will be described below along the flowchart shown in FIG. 6. The flowchart of FIG. 6 shows processing in the case where after the collision prediction level $\alpha$ is continuously outputted for a predetermined time, the brake assist control is prohibited on the assumption that sensor failure or the like induced incorrect action in the danger prediction determination.

This flowchart is activated by an on operation of the ignition switch. After the start, the calculation part moves to S302 to retrieve the collision prediction level $\alpha$, which is the result of determination by the collision prediction determination part 100. At subsequent S304, the calculation part determines whether the value of collision prediction level $\alpha$ retrieved at S302 satisfies $\alpha>0$. When the determination result is that the collision prediction level $\alpha$ is equal to 0 (in the case of "No" at S304), the calculation part moves to S306 to reset the value of count T of a timer measuring a time when collision prediction level $\alpha$ becomes greater than 0, to T=0, and then again starts the processes at and after S302.

On the other hand, when at S304 the collision prediction level $\alpha$ satisfies $\alpha>0$ (in the case of "Yes" at S304), the calculation part moves to S308 to count up the value of count T of the timer to T+1, and thereafter moves to S310. At S310, the calculation part determines whether the count T of the timer exceeds a predetermined threshold Tth. The current routine is terminated with the determination of "No." However, in the case of "Yes" at S310, i.e., when the count T of the timer exceeds the predetermined threshold Tth, the current status is that the time with the collision prediction level $\alpha$ satisfying the condition of $\alpha>0$ is too long over the threshold Tth. It is assumed in this status that an incorrect collision determination was made because of an erroneous detection of continuously detecting noise by obstacle sensor 10, a communication failure such as inclusion of noise in a detection signal, or a failure in the sensor itself or in the collision prediction determination part 100 itself, and then the calculation part proceeds to S312 to prohibit the brake assist control itself.

It is determined at S312 whether the brake assist control is active, i.e., whether the braking increase $\Delta P$ is in setting, for example, by determining whether the value of flag F is set at F=1 as previously described with FIG. 5. When the braking increase $\Delta P$ is in setting (in the case of "Yes" at S312), this determination is repeatedly executed before an end of the brake assist control. Once the brake assist control is terminated, S312 results in making the determination of "No" and the calculation part goes to S314 to inform the driver of occurrence of the failure in the brake assist control system by lighting an alarm lamp. Then the calculation part moves to S316 to prohibit the brake assist control processing shown in FIG. 4 or in FIG. 5, and then terminates the determination routine of FIG. 6.

The flowchart of FIG. 6 included the measurement of the time when the collision prediction level $\alpha$ satisfied the condition of $\alpha>0$. Another example is measurement of a time when $\alpha>\alpha 1$ and the threshold for $\alpha$ as a target for the measurement can be set as occasion demands.

The flowchart of FIG. 6 exemplified the case where the brake assist control was prohibited when the count T of the timer exceeded the threshold Tth. In addition thereto, it may also be determined that the brake assist control is prohibited when the vehicle velocity V is smaller than the predetermined low velocity Vth or when the gearshift lever is placed in a non-forward position (one of the P [Parking], N [Neutral], or R [reverse] position), as also described previously with FIG. 5.

The flowchart of FIG. 6 exemplified the case where the brake assist control processing was prohibited, but the determination process itself by the collision prediction determination part 100 may be prohibited, so as to forcibly supply the collision prediction level $\alpha=0$ to the brake control amount calculation part 200. In this case, S316 is configured to prohibit the determination process of the collision prediction determination part 100, so as to prohibit the brake assist control.

FIGS. 7 to 10 schematically show typical working situations of the brake assist control shown in the flowchart of FIG. 4.

Figure 7:
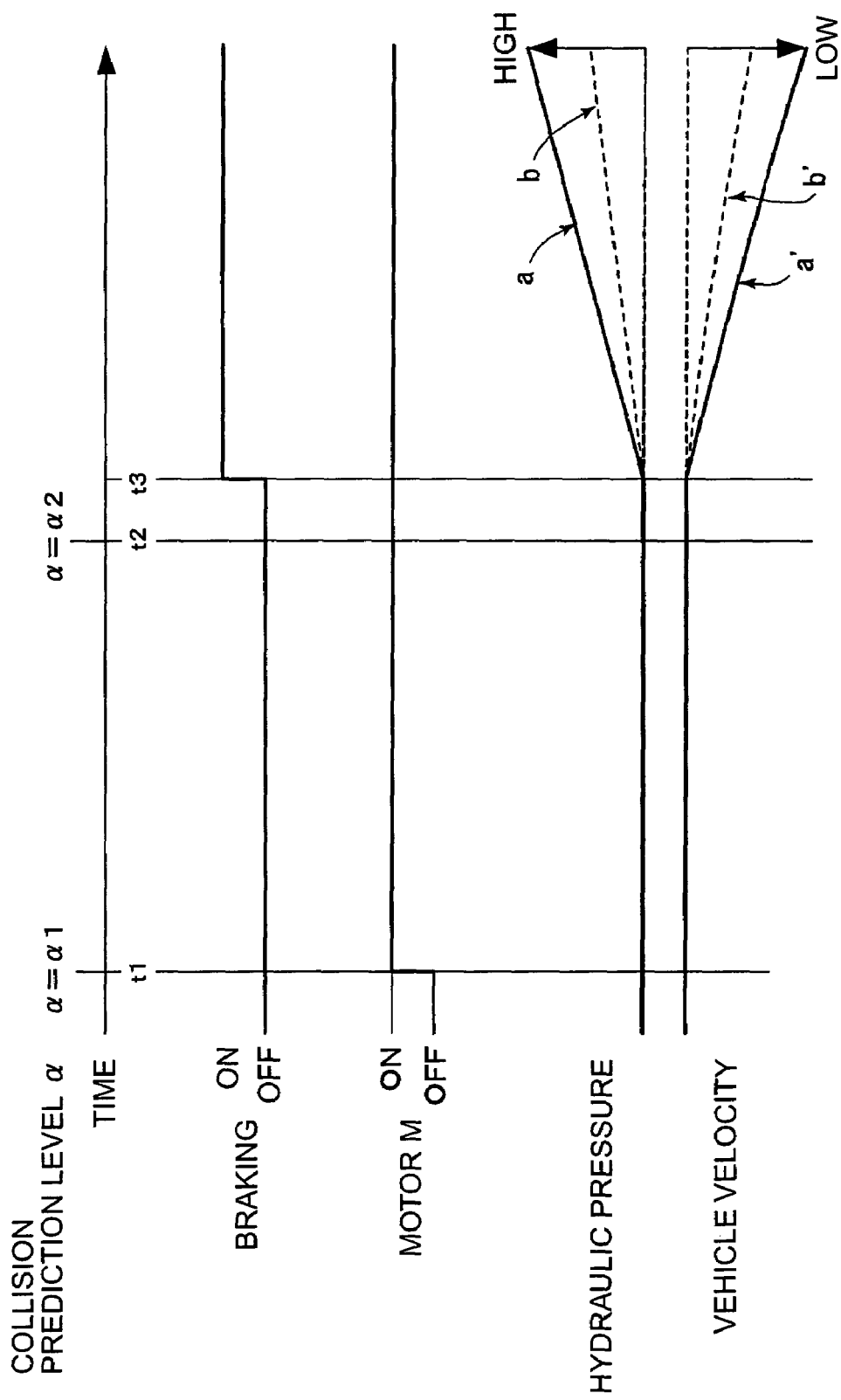
FIG. 7 is an illustration schematically showing an activation of brake assist control.

In first FIG. 7, when the collision prediction level α comes to satisfy α=α1 at time t1, the motor M is switched on. When the collision prediction level α comes to satisfy α=α2 at time t2, the conditions for execution of the brake assist control are met, but the brake pedal 1 is not depressed yet in fact. Therefore, there is no change in the pressure of the brake fluid in the wheel cylinders. When a braking operation is started at time t3, the brake assist control is initiated. The pressure of the brake fluid at time t3 is defined as pressure reference value Ps (Ps=0 in this case), the brake assist force is imparted according to the increase deviation from the pressure reference value Ps, and the pressure of the brake fluid increases as indicated by arrow a. Arrow b indicates a transition of the pressure of the brake fluid without execution of the brake assist control, and arrows a', b' indicate change of vehicle velocity against the transitions of the pressure of the brake fluid as indicated by the respective arrows a, b.

Figure 8:
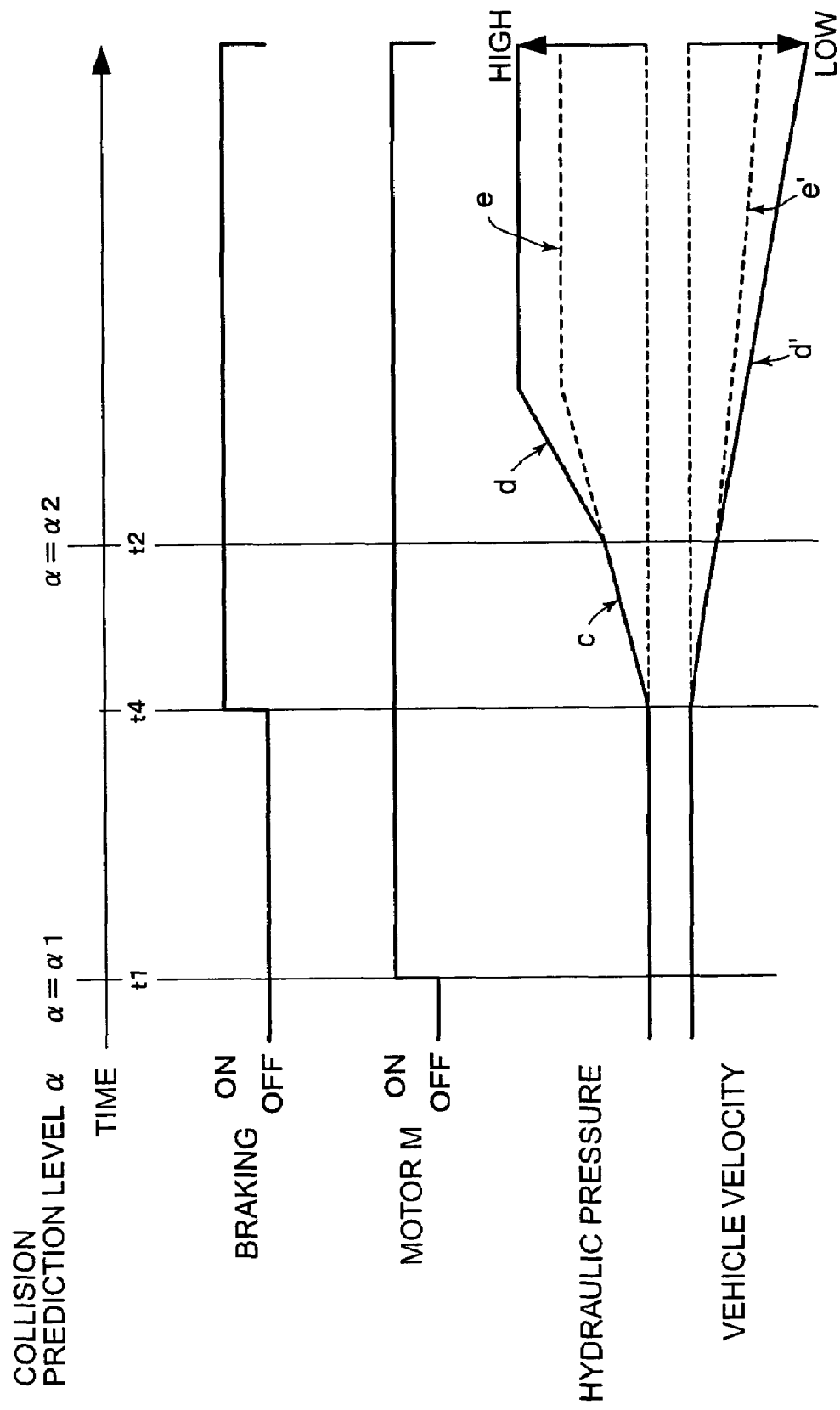
FIG. 8 is an illustration schematically showing an activation of brake assist control.

If the braking operation is started at time t4 after the time t1 and before the time t2, as shown in FIG. 8, the brake assist control is not carried out during the period between the times t4 and t2, because the collision prediction level α falls within the range of α1<α<α2. During this period, the pressure of the brake fluid according to the braking operation acts in the wheel cylinders, as indicated by arrow c. When the collision prediction level α comes to satisfy α=α2 at time t2, the brake assist control is initiated. The pressure of the brake fluid at time t2 is defined as pressure reference value Ps, the brake assist force is imparted according to the increase deviation from this pressure reference value Ps, and the pressure of the brake fluid increases as indicated by arrow d. Arrow e indicates a transition of the pressure of the brake fluid without execution of the brake assist control, and arrows d', e' indicate change of vehicle velocity against the transitions of the pressure of brake fluid as indicated by the respective arrows d, e.

Figure 9:
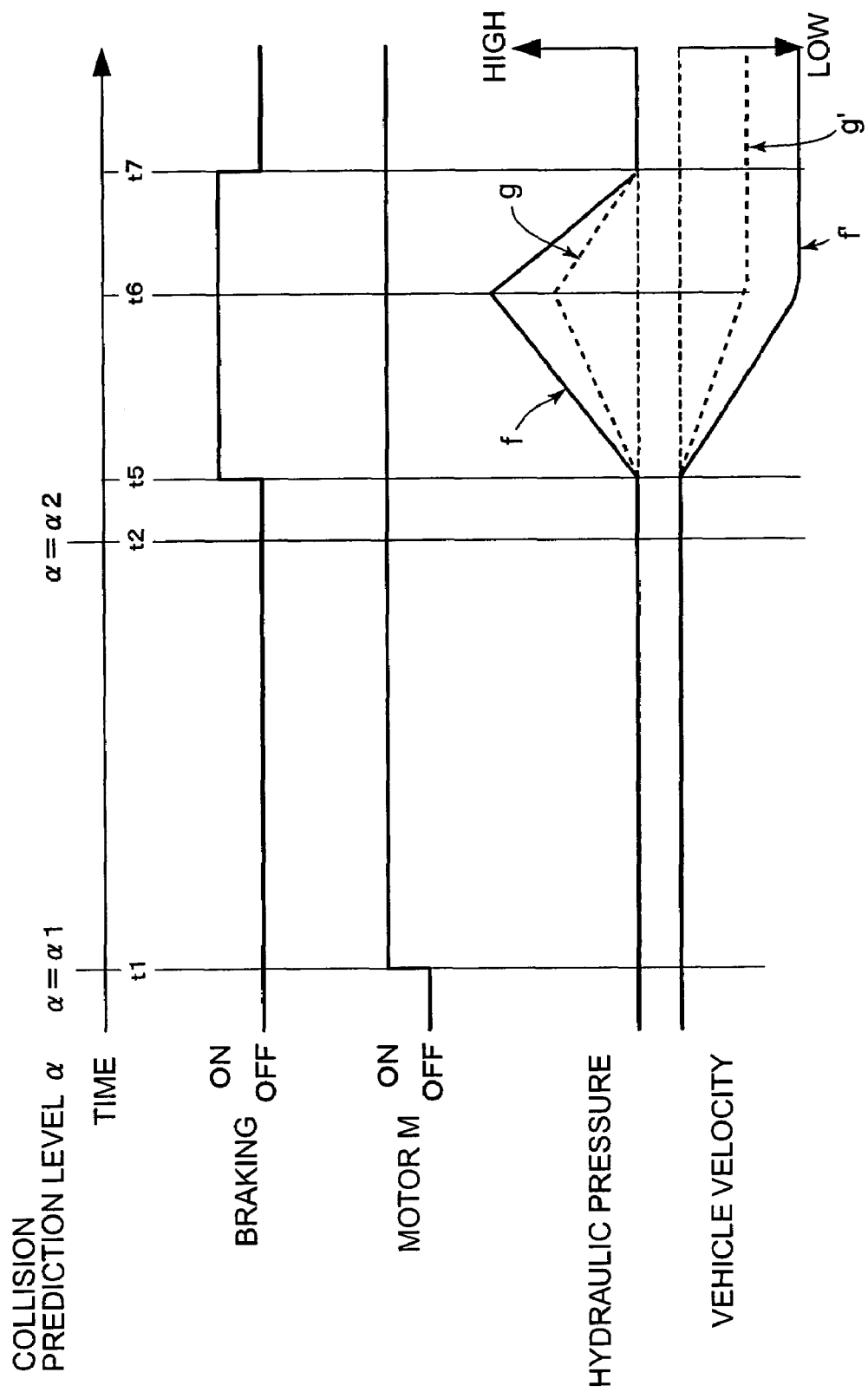
FIG. 9 is an illustration schematically showing an activation of brake assist control.

If the brake pedal 1 is depressed at time t5 after the time t2, as shown in FIG. 9, the brake assist control is initiated thereat. In this case, the pressure of the brake fluid at time t5 is defined as pressure reference value Ps, the brake assist force is imparted according to the increase deviation from this pressure reference value Ps, and the pressure of the brake fluid increases as indicated by arrow f. When the driver loosens the depression on the brake pedal 1 at time t6, the deviation from the pressure reference value Ps gradually decreases between times t6 and t7, and the brake assist force also gradually decreases according thereto. At time t7 the driver takes the foot off the brake pedal 1, whereupon the brake assist control is terminated. Arrow g indicates a transition of the pressure of the brake fluid without execution of the brake assist control, and arrows f', g' indicate change states of vehicle velocity against the transitions of the pressure of the brake fluid as indicated by the respective arrows f, g.

Figure 10:
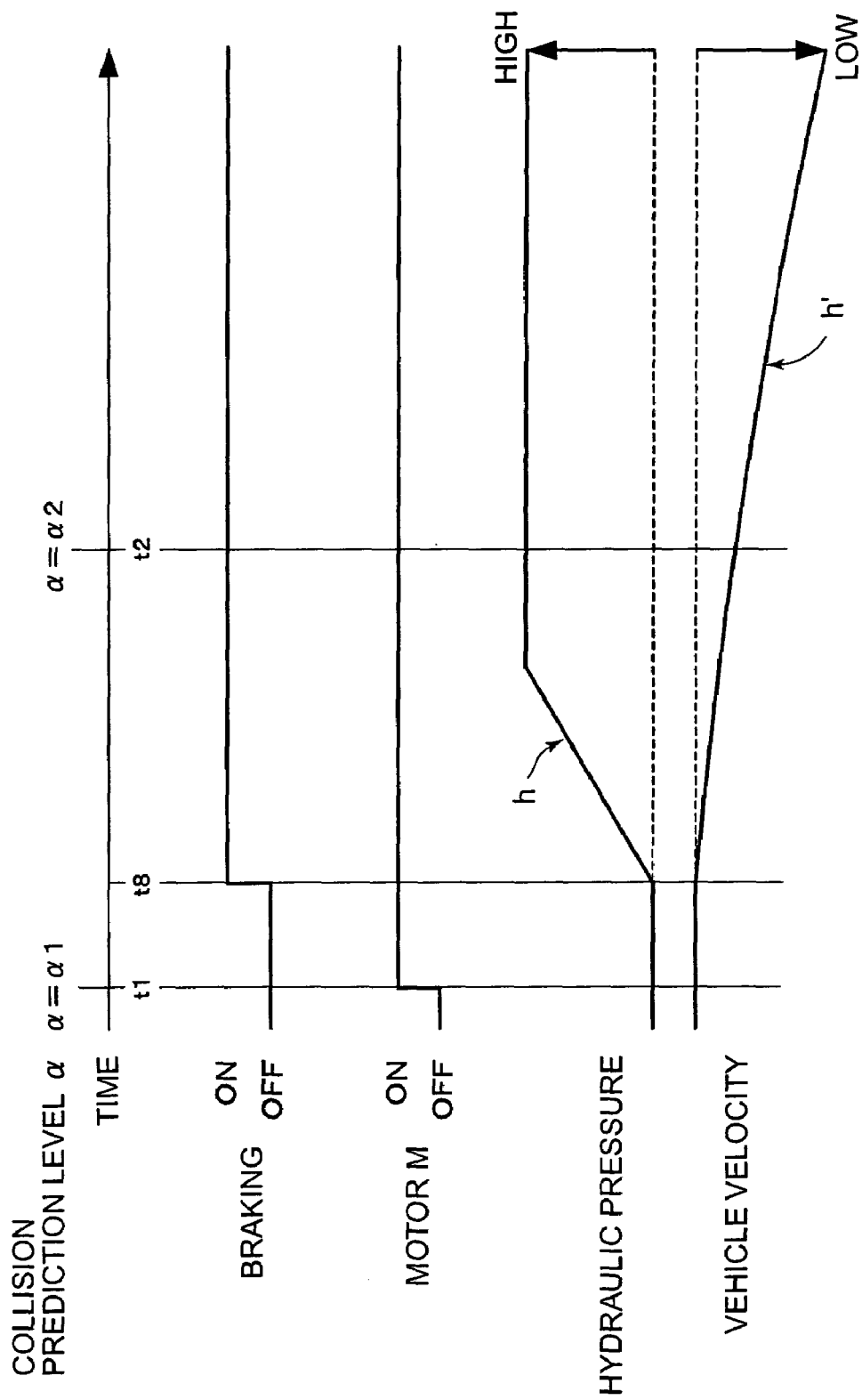
FIG. 10 is an illustration schematically showing an activation of brake assist control.

In the case where the braking operation is started at time t8 and where a sufficient amount of brake operation is achieved before time t2 when the collision prediction level α comes to satisfy α=α2, so as to obtain a sufficiently high pressure of the brake fluid (the master pressure P herein), as shown in FIG. 10, the brake assist control is not carried out, the pressure of the brake fluid generated by the braking operation is supplied to the wheel cylinders of the respective wheels, and the pressure of the brake fluid changes as indicated by arrow h. Arrow h' indicates a change state of vehicle velocity against the transition of the pressure of the brake fluid as indicated by the arrow h.

Figure 11:
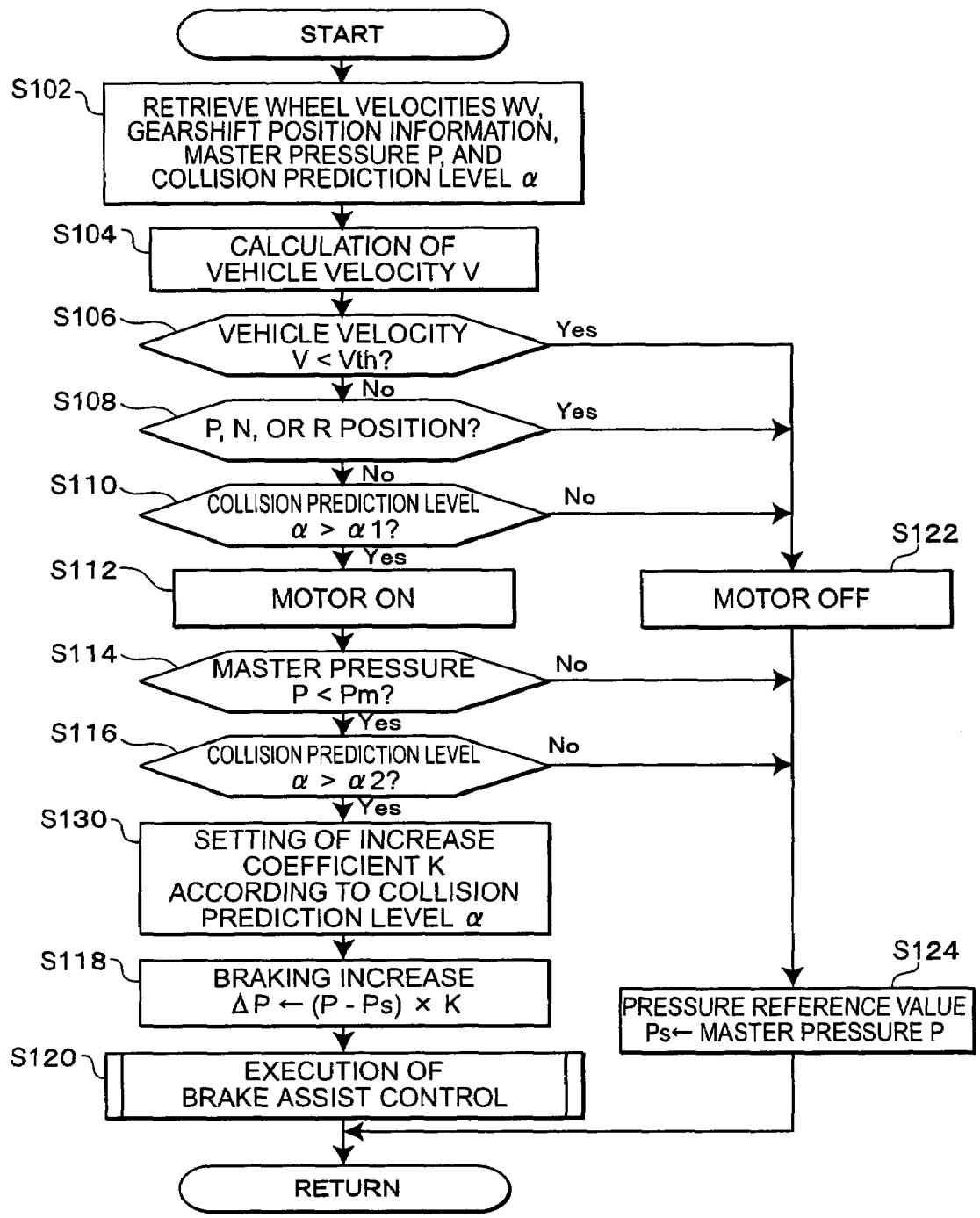
FIG. 11 is a flowchart showing the brake assist control processing according to another embodiment.

Still another embodiment will be described below. The process step indicated as S118 in FIG. 4 and others was described in the example where the braking increase ΔP was set according to ΔP=(P−Ps)×K. However, the value of this increase coefficient K (K>0) can also be variably set according to the value of collision prediction level α. The control processing in this case is presented in FIG. 11. The flowchart shown in FIG. 11 adopts all the process steps shown in the flowchart of FIG. 4 and also includes a newly added step of S130.

Figure 12:
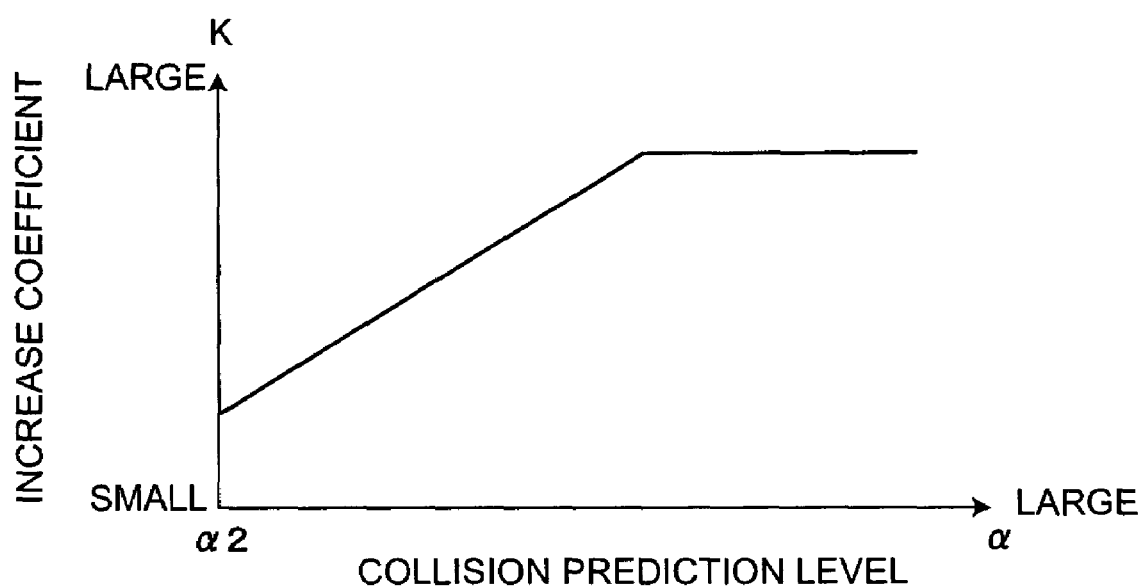
FIG. 12 is a graph stipulating the relationship between collision prediction level and increase coefficient K.

As described previously, it is determined at S116 whether the value of collision prediction level α exceeds α2, which is a condition for a start of brake assist control. When α exceeds α2 (in the case of "Yes" at S116), the calculation part moves to S130 to set the value of increase coefficient K according to the value of collision prediction level α retrieved at S102, based on the graph shown in FIG. 12. In FIG. 12, the value of increase coefficient K tends to gradually increase as the collision prediction level α increases from α=α2. Therefore, a larger value of increase coefficient K is set in a sufficiently high region of collision prediction level α from α=α2 than in a low region thereof. After the value of increase coefficient K is set according to the collision prediction level α at S130 in this way, the braking increase ΔP is set according to ΔP=(P−Ps)×K.

Therefore, the braking increase ΔP is set to a larger value in the situation where the collision prediction level α is larger than α2; this makes it feasible to generate a larger brake assist force where the value of collision prediction level α is large.

Still another embodiment will be described. In the case of the brake assist control shown in FIG. 4 and others, the brake assist force is generated according to the increase of the master pressure P from the reference level Ps, and in this respect, for example, if the increase of the master pressure P is small from that at the point where the collision prediction level α exceeds α2, the brake assist force generated will also be a small force. In the situation where the value of collision prediction level α exceeds α2 as the threshold for initiation of the control, even if the deviation is small between master pressure P and reference level Ps, it is also possible to generate a predetermined brake assist force (standard brake assist force) as a minimum required force greater than the brake assist force corresponding to the small deviation.

Figure 13:
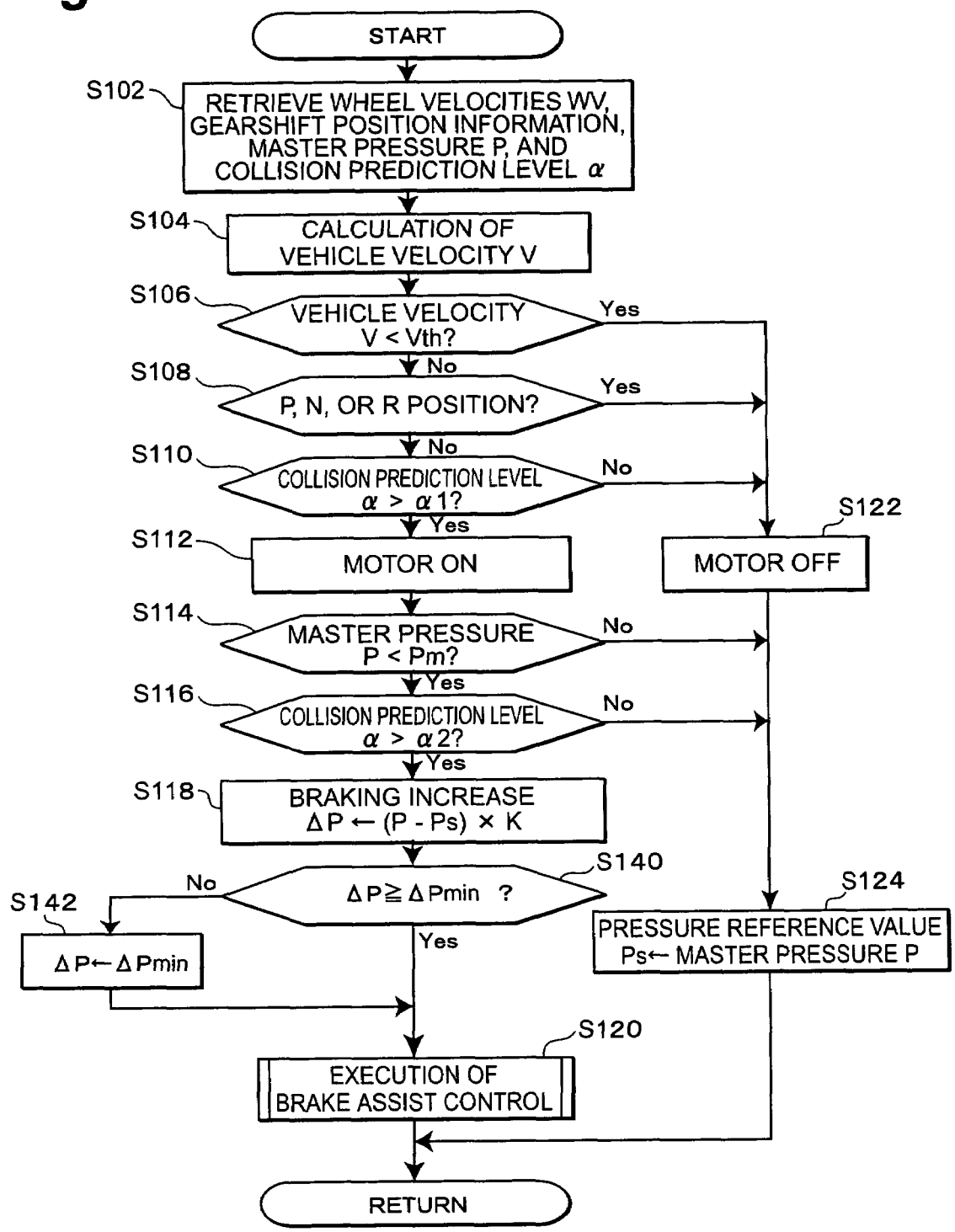
FIG. 13 is a flowchart showing the brake assist control processing according to another embodiment.

FIG. 13 shows a control processing example of such brake assist control. The flowchart shown in FIG. 13 adopts all the process steps shown in the flowchart of FIG. 4 and also includes newly added steps of S140 and S142.

After the braking increase ΔP is set according to ΔP=(P−Ps)×K at S118 as described previously, the calculation part proceeds to S140 to determine whether the braking increase ΔP calculated at S118 is not less than minimum braking increase ΔPmin which is a prescribed lower limit of braking increase ΔP. This minimum braking increase ΔPmin is a prescribed value as a braking increase amount for generating the "standard brake assist force" to be exerted as a minimum required force, at a start of the brake assist control.

When the braking increase ΔP calculated at S118 is not less than this minimum braking increase ΔPmin (in the case of "Yes" at S140), the calculation part moves to S120 to carry out the control of actuation of brake actuator 300 on the basis of the braking increase ΔP calculated at S118 as described previously.

On the other hand, when the braking increase ΔP calculated at S118 is smaller than the minimum braking increase ΔPmin (in the case of "No" at S140), the calculation part proceeds to S142 of an update process to define as new ΔP the minimum braking increase ΔPmin greater than the braking increase ΔP calculated at S118, and then moves to S120.

Accordingly, when the braking increase ΔP calculated at S118 is smaller than the minimum braking increase ΔPmin, a constant brake assist force is always generated corresponding to the minimum braking increase ΔPmin. On the other hand, when the braking increase ΔP calculated at S118 is not less than the minimum braking increase ΔPmin, the brake assist force is generated according to the braking increase ΔP calculated at S118 (or calculated from P based on the driver's braking operation).

Figure 14:
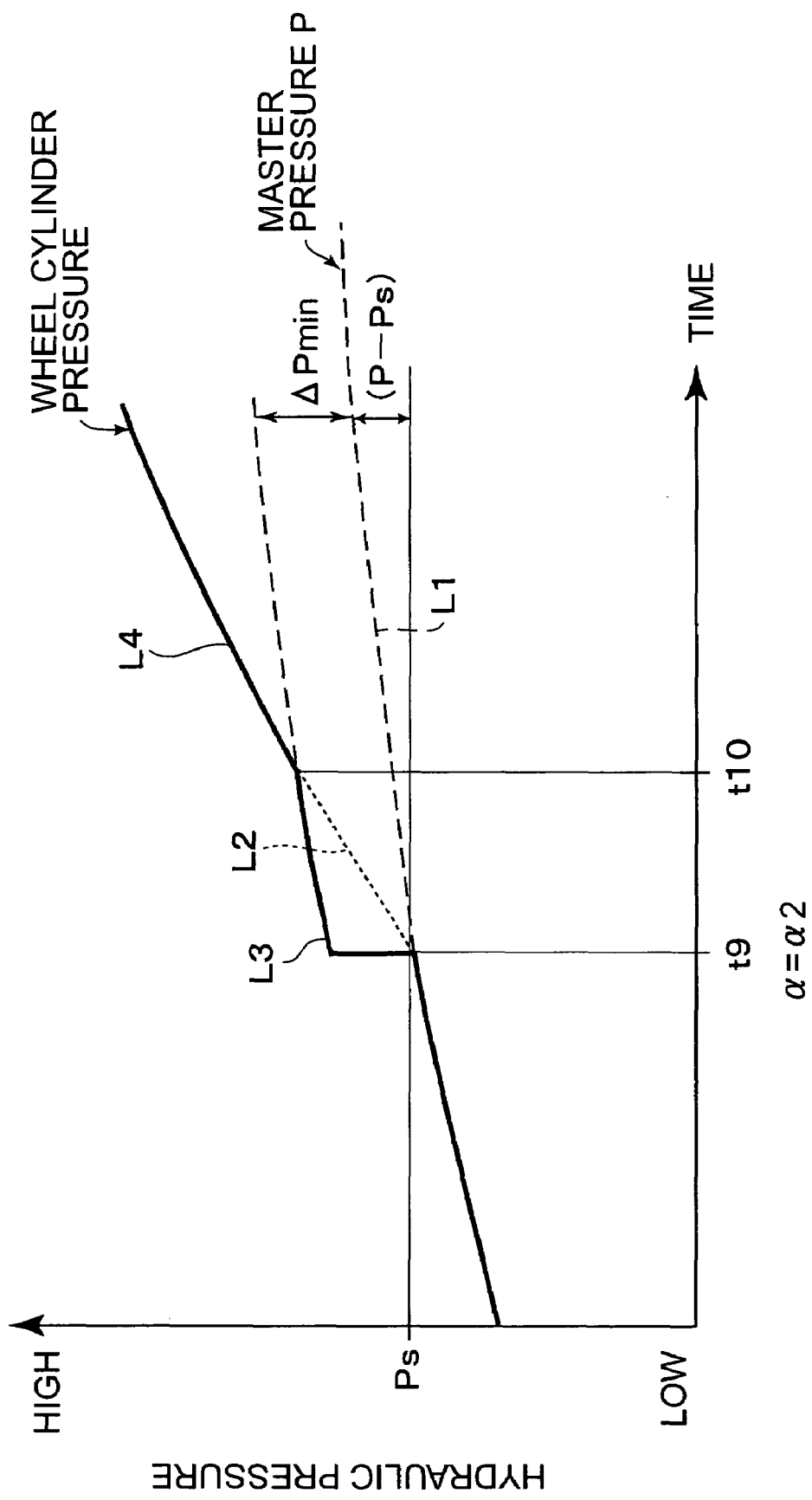
FIG. 14 is a chart showing a transition of hydraulic pressure in the case where the control process of FIG. 13 is carried out.

FIG. 14 shows a transition state of hydraulic pressure with execution of the control processing as described above. When the collision prediction level α comes to satisfy α=α2 at time t9, the master pressure P at this point is the pressure reference value Ps. Within a small increase range where the increase of master pressure P thereafter is small as indicated by dashed line L1, if the braking increase ΔP calculated at S118 is directly applied to generation of the brake assist force, the increase of the wheel cylinder pressure will also become sluggish as indicated by dotted line L2 between times t9 and t10. However, it is desirable to demonstrate the effect of brake assist more during this period (t9–10).

Therefore, when the braking increase ΔP calculated at S118 is smaller than the minimum braking increase ΔPmin, the braking increase ΔP calculated at S118 is updated to the minimum braking increase ΔPmin (S142), whereby the brake assist force corresponding to the minimum braking increase ΔPmin will be practically exerted to the master pressure P even during the period between times t9 and t10 (locus L3: t9–10). The braking increase ΔP calculated at S118 becomes not less than the minimum braking increase ΔPmin at time t10, and thereafter the brake assist force is generated according to the driver's braking operation, based on the braking increase ΔP calculated at S118 (locus L4: t10-).

The flowchart of FIG. 13 exemplified the case where the calculation part moved to S140 through the processes of S116 and S118, but the flowchart may also be modified so that S130 (FIG. 11) is executed between S116 and S118 to set the value of increase coefficient K according to the collision prediction level α.

Figure 15:
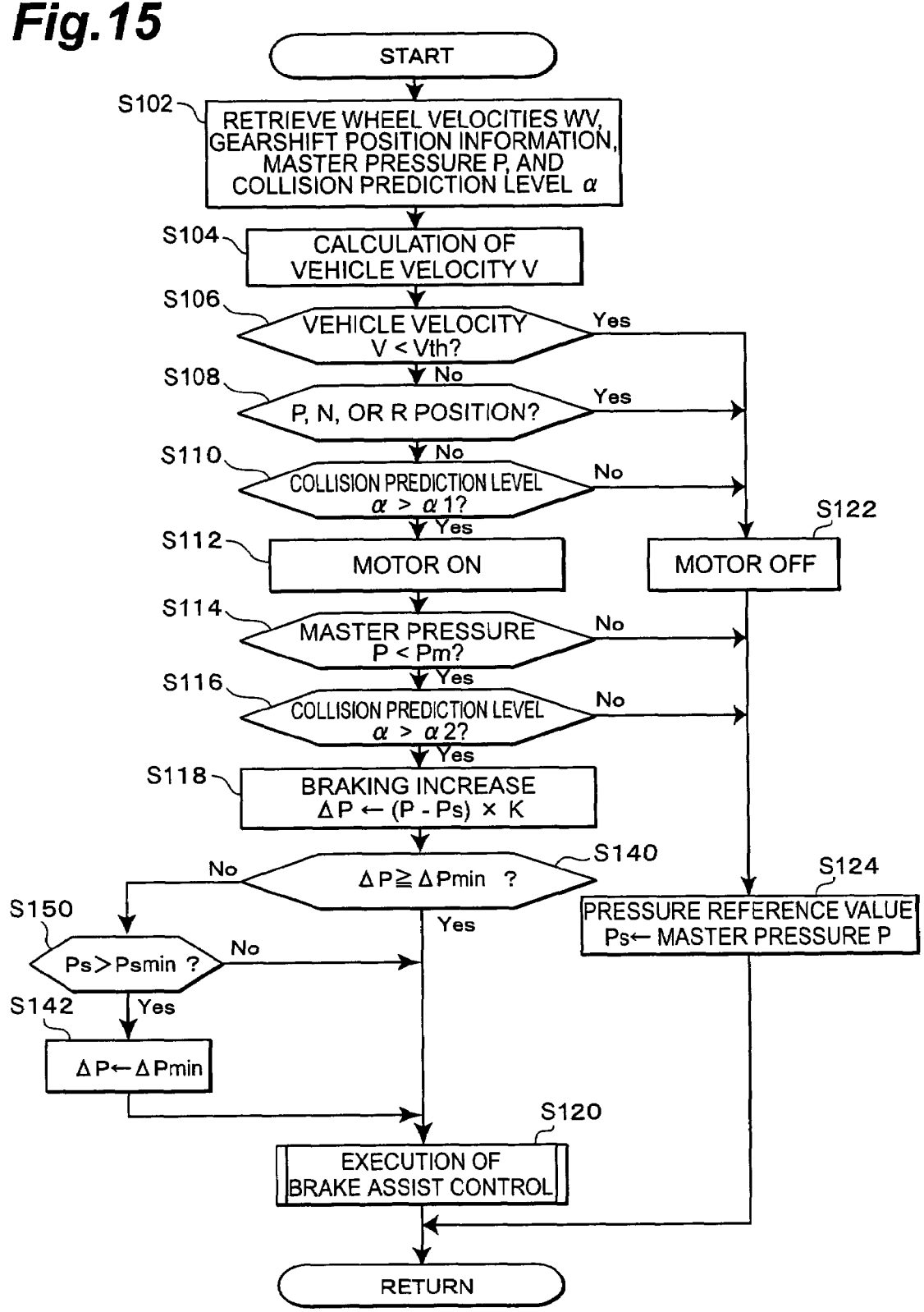
FIG. 15 is a flowchart showing the brake assist control processing according to another embodiment.

Still another embodiment is shown in FIG. 15. In the flowchart of FIG. 15, S150 is added between S140 and S142 in the flowchart of FIG. 13. The calculation part moves to this S150 in a situation where the braking increase ΔP calculated at S118 is smaller than the minimum braking increase ΔPmin (in the case of "No" at S140). In FIG. 13 described previously, the calculation part goes to S142 to update the braking increase ΔP to the minimum braking increase ΔPmin and then goes to S120 to carry out the control of actuation of brake actuator 300.

In the case of the so-called slow braking where the pressure reference value Ps stored at the start of the brake assist control is not more than the predetermined low pressure, it can be assumed that the driver does not require very hard braking, and the collision prediction determination part 100 is highly likely to incorrectly have made the determination that the collision prediction level α was large, for some reason, e.g., because of an incorrect detection. If the standard brake assist force as described previously is generated in this case, the braking force will suddenly increase to cause the driver to feel odd.

Therefore, in the case of "No" at S140, i.e., in the situation where the braking increase ΔP calculated at S118 is smaller than the minimum braking increase ΔPmin, the calculation part first goes to S150 to determine whether the pressure reference value Ps stored at the start of the brake assist control is greater than a predetermined low pressure threshold Psmin. When the pressure reference value Ps is larger than the low pressure threshold Psmin (in the case of "Yes" at S150), the calculation part proceeds to S142, as described previously, to update the braking increase ΔP to the minimum braking increase ΔPmin. On the other hand, when the pressure reference value Ps falls in the slow braking range of not more than the low pressure threshold Psmin (in the case of "No" at S150), the calculation part directly goes to S120 to generate the brake assist force based on the braking increase ΔP calculated at S118. The brake assist force generated on this occasion is an assist force smaller than the "standard brake assist force" to be exerted as a minimum required force, so that the small brake assist force is exerted according to the driver's braking operation. Therefore, S150 functions as a prohibition process of prohibiting the process of generating the standard brake assist force, in the slow braking case, which can adequately decrease the odd feeling of the driver due to the exertion of the standard brake assist force during the slow braking operation.

Each of the embodiments described above was described using the example of the safety apparatus of the type in which the brake assist force was generated in the case of the level of risk of collision being high, in the case of securing the predetermined intervehicle distance, etc., as vehicular safety apparatus, but the present invention can also be applied to the safety apparatus other than the safety apparatus of generating the brake assist force as described. For example, the present invention can also be applied to pretensioner belts of such structure that seat belts are rewound by motors or the like upon a prediction of a collision to preliminarily exert a predetermined strong tension on the seat belts to protect occupants. In this case, the control processing in each of the aforementioned embodiments can be executed as a control of actuation of the motors for rewinding the seat belts, for example, in such a way that the tension on the seat belts is increased according to the increase deviation of the master pressure P from the pressure reference value Ps.

As described above, the vehicular safety apparatus of the present invention employed the configuration comprising the storage means for storing the amount of brake operation by the driver at the point where the collision prediction level exceeds the threshold, and the actuation control means for actuating the safety apparatus in accordance with the increase of this amount of brake operation from the reference level. This prevents the safety apparatus from being excessively actuated in the case where the increase of the amount of brake operation by the driver is low, and the actuation control can be carried out so as to adequately demonstrate the performance of the safety apparatus in the case where the increase of the amount of brake operation is high. Accordingly, it becomes feasible to perform the control of actuation of the safety apparatus while fully reflecting the actual operational feeling during the driver's braking operation and to suitably demonstrate the performance of the safety apparatus without causing the driver to feel odd.

When the safety apparatus further comprises the prohibiting means for prohibiting the control processing of the actuation control means in the case where the collision prediction level of not less than the predetermined level continues for the predetermined period, it becomes feasible to prevent the unwanted operation of the vehicular safety apparatus, for example, where incorrect determinations are continuously made because of sensor failure or the like.

When the safety apparatus further comprises the prohibiting means for prohibiting the control processing of the actuation control means in the low range of vehicle velocity or with the gearshift lever being placed in a non-forward position, it is feasible to prevent the safety apparatus from being improperly actuated where the actuation of the safety apparatus is substantially unnecessary.

When the actuation control means is configured to execute the actuation control to be executed with the increase being larger, in the high collision prediction level region than in the low region even against the same increase from the reference level, the performance of the safety apparatus is demonstrated more in the high region of the collision prediction level, and it becomes feasible to prevent the actuation of the safety apparatus from becoming excessive in the low region of collision prediction level.

When the safety apparatus is constructed adopting the configuration comprising the minimum control means for, even if the increase of the amount of brake operation from the reference level is within the range of the predetermined small increase, carrying out the actuation control according to the predetermined increase over the range of the small increase, it becomes feasible to surely demonstrate the minimum required performance of the safety apparatus even in the case where the increase of the amount of brake operation is small after the point where the collision prediction level exceeds the threshold.

When the safety apparatus comprises the prohibiting means for prohibiting the minimum control means from performing the actuation control if the increase from the reference level is within the small increase range and if the reference level is within the predetermined slow braking range, it becomes feasible to decrease the odd feeling of the driver in the event of incorrect actuation of the safety apparatus during slow braking.

When the safety apparatus further comprises the brake control means for generating the brake assist force and is arranged so that the actuation control means carries out the actuation control of the brake control means to generate a larger brake assist force with increase in the increase of the amount of brake operation from the reference level, it can prevent the brake assist force from becoming excessive where the increase of the amount of brake operation by the driver is low, and it can generate the larger brake assist force where the increase of the amount of brake operation of braking is high; therefore, it becomes feasible to generate the brake assist force while adequately reflecting the actual operational feeling during the braking operation.

When the amount of brake operation by the driver is the quantity indicating the force of driver's braking operation, the magnitude of the force of driver's braking operation is taken as the magnitude of degree to demonstrate the performance of the safety apparatus, and the control of actuation of the safety apparatus is carried out on the basis thereof; therefore, it becomes feasible to suitably demonstrate the performance of the safety apparatus without causing the driver to feel odd, while adequately reflecting the actual operational feeling of the driver.

What is claimed is:

1. A vehicular safety apparatus comprising:
   determining means for determining a collision prediction level of a vehicle based on a relative position between the vehicle and an obstacle ahead of the vehicle;
   storage means for storing an amount of brake operation by a driver at a point where the collision prediction level determined by the determining means exceeds a predetermined threshold, as a reference level; and
   actuation control means for actuating the safety apparatus in accordance with an increase of the amount of brake operation of braking by the driver from the reference level stored in the storage means.

2. The vehicular safety apparatus according to claim 1, further comprising prohibiting means for prohibiting the actuation control means from performing a control process if the determining means continuously determines the collision prediction level of not less than a predetermined level for a fixed period.

3. The vehicular safety apparatus according to claim 1, further comprising prohibiting means for prohibiting the actuation control means from performing a control process in at least one of a case where a vehicular velocity is a predetermined low velocity including a stop state and a case where a gearshift lever is placed in a non-forward position.

4. The vehicular safety apparatus according to claim 1, wherein on the occasion of carrying out the control of the safety apparatus in accordance with the increase of the amount of brake operation from the reference level, the increase being supposed to be equal, the actuation control means carries out the control for greater increases in the higher collision prediction level than in the lower collision prediction level.

5. The vehicular safety apparatus according to claim 1, wherein the actuation control means further comprises minimum control means for, when the increase of the amount of brake operation from the reference level is within a range of a predetermined small increase, carrying out the control of the safety apparatus in accordance with a predetermined increase over the range of the small increase.

6. The vehicular safety apparatus according to claim 5, further comprising prohibiting means for prohibiting the minimum control means from performing the control if the increase of the amount of brake operation from the reference level is within the range of the predetermined small increase and if the reference level is within a predetermined slow braking range.

7. The vehicular safety apparatus according to claim 1, further comprising brake control means for generating a brake assist force to increase a braking force according to a braking operation,
   wherein the actuation control means controls the brake control means to generate a greater brake assist force as the increase from the reference level becomes larger.

8. The vehicular safety apparatus according to claim 7, wherein the amount of brake operation is a quantity indicating a force of driver's braking operation.

9. The vehicular safety apparatus according to claim 8, wherein the force of driver's braking operation is a pressure of a brake master cylinder.

10. The vehicular safety apparatus according to claim 1, wherein the determining means determines a larger collision prediction level with decrease in a value of a result of calculation of dividing a distance between the vehicle and the obstacle by a relative velocity of the obstacle to the vehicle.

11. The vehicular safety apparatus according to claim 7, wherein the brake control means for generating the brake assist force is comprised of a pump motor for increasing a pressure of a wheel cylinder, and a plurality of valves disposed on brake piping.

12. The vehicular safety apparatus of claim 1, wherein the vehicular safety apparatus is capable of performing a braking assist process, and the reference level corresponds to an amount of brake operation of a driver during a previous cycle of the braking assist process.

13. A vehicular safety apparatus comprising:
  determining means for determining a collision prediction level of a vehicle on the basis of relative position and relative velocity between the vehicle and an obstacle ahead of the vehicle;
  storage means for storing an amount of brake operation by a driver at a point where the collision prediction level of the vehicle determined by the determining means exceeds a predetermined threshold;
  brake control means for generating a brake assist force; and
  actuation control means for, while defining the amount of brake operation stored in the storage means as a reference level, determining the brake assist force to be generated by the brake control means based on an increase of the amount of brake operation from the reference level, and actuating the brake control means.

14. The vehicular safety apparatus according to claim 13, wherein the amount of brake operation is a pressure of a brake master cylinder.

15. The vehicular safety apparatus according to claim 14, wherein the determining means determines the collision prediction level based on a value of a result of calculation of dividing a distance between the vehicle and the obstacle by a relative velocity of the obstacle to the vehicle.

16. The vehicular safety apparatus according to claim 15, wherein the determining means determines a greater collision prediction level with decrease in the value of the result of the calculation.

17. The vehicular safety apparatus according to claim 16, wherein on the occasion of determining the brake assist force according to an increase of the master cylinder pressure from the reference level, the actuation control means determines a greater brake assist force at the higher collision prediction level than at the lower collision prediction level.

18. The vehicular safety apparatus according to claim 14, wherein on the occasion of determining the brake assist force according to an increase of the master cylinder pressure from the reference level, if the increase of the master cylinder pressure is less than a predetermined value, the actuation control means actuates the brake control means so as to generate a brake assist force corresponding to the predetermined value.

19. The vehicular safety apparatus of claim 13, wherein the vehicular safety apparatus is capable of performing a braking assist process, and the reference level corresponds to an amount of brake operation of a driver during a previous cycle of the braking assist process.

20. A vehicular safety apparatus capable of performing a braking assist process, the vehicular safety apparatus comprising:
  a storage device that stores a reference braking amount by a driver of a vehicle;
  a collision predicting device that determines a collision prediction level of the vehicle based on a relative position between the vehicle and an obstacle ahead of the vehicle,
  a braking amount sensor, the braking amount sensor determining a present braking amount by a driver of the vehicle;
  a brake control calculation device that receives a result of the determination made by the collision predicting device and sets a brake assist amount;
  a brake actuator that generates a brake assist force based on the brake assist amount set by the brake control calculation device,
  wherein:
  the brake control calculation device sets the brake assist amount based on a difference between the present braking amount and the stored reference braking amount, and
  the present braking amount is stored in the storage device as the reference braking amount for a next cycle of the braking assist process.

* * * * *